(12) United States Patent
Uozumi et al.

(10) Patent No.: US 10,788,069 B2
(45) Date of Patent: Sep. 29, 2020

(54) JOINED COMPONENT AND METHOD FOR MANUFACTURING JOINED COMPONENT

(71) Applicant: Sumitomo Electric Sintered Alloy, Ltd., Takahashi (JP)

(72) Inventors: Masato Uozumi, Itami (JP); Yosuke Kimura, Itami (JP)

(73) Assignee: Sumitomo Electric Sintered Alloy, Ltd., Takahashi (JP)

( * ) Notice: Subject to any disclaimer, the term of this patent is extended or adjusted under 35 U.S.C. 154(b) by 317 days.

(21) Appl. No.: 15/562,108

(22) PCT Filed: Nov. 26, 2015

(86) PCT No.: PCT/JP2015/083145
§ 371 (c)(1),
(2) Date: Sep. 27, 2017

(87) PCT Pub. No.: WO2016/157612
PCT Pub. Date: Oct. 6, 2016

(65) Prior Publication Data
US 2018/0073535 A1    Mar. 15, 2018

(30) Foreign Application Priority Data

Mar. 30, 2015 (JP) .................. 2015-070243

(51) Int. Cl.
*B23K 1/20* (2006.01)
*B23K 1/14* (2006.01)
(Continued)

(52) U.S. Cl.
CPC ................ *F16B 5/08* (2013.01); *B23K 1/14* (2013.01); *B23K 1/18* (2013.01); *B23K 1/19* (2013.01)

(58) Field of Classification Search
CPC . B22F 7/062; B22F 7/064; B23K 1/14; B23K 1/16; B23K 1/18; B23K 1/20
See application file for complete search history.

(56) References Cited

U.S. PATENT DOCUMENTS

| 4,425,299 A | 1/1984 | Koiso | |
|---|---|---|---|
| 2011/0111247 A1* | 5/2011 | Lemke | B23K 1/0008 |
| | | | 428/600 |

FOREIGN PATENT DOCUMENTS

| JP | S52-097926 U | 7/1977 |
|---|---|---|
| JP | 57-012756 U | 7/1980 |

(Continued)

*Primary Examiner* — Michael P Ferguson
(74) *Attorney, Agent, or Firm* — Baker Botts L.L.P.; Michael A. Sartori (57) ABSTRACT

It is an object of the present invention to provide a joined component in which the overflow of brazing filler metal from the outer peripheral line of a joint boundary surface between a first member and a second member is suppressed, and a method for manufacturing the joined component. A joined component is obtained by joining, with brazing filler metal, a first member and a second member to each other at a joint boundary surface where the first member and the second member are in contact with each other, the joined component having a non-contact area that is provided on an inner side with respect to an outer peripheral line of the joint boundary surface and in which the first member and the second member are not in contact with each other. In the joined component, the first member has a retaining recess where the brazing filler metal that is melted when the first member and the second member are joined to each other is retained, the retaining recess providing the non-contact area. The molten brazing filler metal including some solidified part forms a brazing-filler-metal pool in the retaining recess.

10 Claims, 6 Drawing Sheets

(51) Int. Cl.
*F16B 5/08* (2006.01)
*B23K 1/18* (2006.01)
*B23K 1/19* (2006.01)

(56) References Cited

FOREIGN PATENT DOCUMENTS

| | | | | |
|---|---|---|---|---|
| JP | S56-89374 A | | 7/1981 | |
| JP | 59-141366 | | 8/1984 | |
| JP | H11-10327 A | | 1/1999 | |
| JP | 2001-138041 | * | 5/2001 | ............... B23K 1/20 |
| JP | 2006-326616 A | | 12/2006 | |
| JP | 2008-302414 | * | 12/2008 | ............... B23K 1/14 |
| JP | 2008-302415 | * | 12/2008 | ............... B23K 1/14 |
| JP | 2008-302415 A | | 12/2008 | |
| JP | 2009-242821 | * | 10/2009 | ................ B22F 7/04 |
| JP | 2010-004336 A | | 1/2010 | |
| JP | 2013-024483 A | | 2/2013 | |
| WO | WO 2010/106616 | * | 9/2010 | ............. B23K 33/00 |

* cited by examiner

JOINED COMPONENT AND METHOD FOR MANUFACTURING JOINED COMPONENT

TECHNICAL FIELD

The present invention relates to a joined component obtained by joining a first member and a second member to each other with brazing filler metal and to a method for manufacturing the same.

BACKGROUND ART

A joined component obtained by joining, with brazing filler metal, a first member and a second member that are prepared separately is used as one of the elements of an apparatus, such as a pump and a compressor, intended for various fields. For example, a joined component disclosed by PTL 1 includes a first member having a ring and pillar-like portions provided on one side of the ring, and a ring-shaped second member brazed to a bridge portion of the first member.

A method for manufacturing a joined component is also disclosed by PTL 1 in which a first member and a second member are joined to each other. Specifically, brazing filler metal is set in a non-contact area provided on the inner side of the outer peripheral line of a joint boundary surface and in which the first member and the second member are not in contact with each other. Then, the brazing filler metal is melted by heat treatment, whereby the molten brazing filler metal in the non-contact area is spread over the joint boundary surface. Thus, the first member and the second member are joined to each other. In PTL 1, grooves each having a depth of about 0.05 mm are provided in such a manner as to extend radially from the non-contact area, whereby the penetration of the brazing filler metal from the non-contact area into the joint boundary surface is facilitated.

CITATION LIST

Patent Literature

PTL 1: JP2008-302415A

SUMMARY OF INVENTION

Technical Problem

In PTL 1, however, there is a problem in that the brazing filler metal tends to overflow from the position along the outer peripheral line of the joint boundary surface where the first member and the second member are in contact with each other.

According to PTL 1, to suppress the above overflow of the brazing filler metal, the grooves each do not extend up to the outer peripheral line of the joint boundary surface. Nevertheless, according to PTL 1, the molten brazing filler metal is pushed into the grooves under its own weight. Therefore, an excessive amount of brazing filler metal penetrates into the joint boundary surface, leading to possible overflow of the brazing filler metal. If the brazing filler metal overflows, some of the brazing filler metal that has adhered to the outer peripheral surface of the first member not only deteriorates the appearance of the joined component but may also hinder the process of combining the joined component with other mechanical components.

The present invention has been conceived in view of the above circumstances, and it is an object of the present invention to provide a joined component in which the overflow of brazing filler metal from the outer peripheral line of a joint boundary surface between a first member and a second member is suppressed, and a method for manufacturing the joined component.

Solution to Problem

A joined component according to a first aspect of the present invention is obtained by joining, with brazing filler metal, a first member and a second member to each other at a joint boundary surface where the first member and the second member are in contact with each other, the joined component having a non-contact area that is provided on an inner side with respect to an outer peripheral line of the joint boundary surface and in which the first member and the second member are not in contact with each other. The first member has a retaining recess where the brazing filler metal that is melted when the first member and the second member are joined to each other is retained, the retaining recess providing the non-contact area. The molten brazing filler metal including some solidified part forms a brazing-filler-metal pool in the retaining recess.

A method for manufacturing a joined component according to another aspect of the present invention is a method for manufacturing a joined component obtained by joining a first joint surface on one side of a first member and a second joint surface on one side of a second member to each other with brazing filler metal. The method includes the following steps α to γ:

a step α of preparing the first member having a retaining recess in the first joint surface;

a step β of placing the brazing filler metal onto the first member in an area on an inner side with respect to an outer peripheral line of the retaining recess and bringing the second joint surface of the second member into contact with the first joint surface of the first member; and a step γ of melting the brazing filler metal by performing heat treatment.

Molten brazing filler metal that is temporarily retained in the retaining recess in the step γ enters a gap between the first joint surface and the second joint surface, and the brazing filler metal joins the first joint surface and the second joint surface to each other.

Advantageous Effects of Invention

The above joined component is a joined component in which the overflow of the brazing filler metal from the outer peripheral line of the joint boundary surface between the first member and the second member is suppressed.

By the above method for manufacturing a joined component, when the first member and the second member are joined to each other, the overflow of the brazing filler metal from the outer peripheral line of the joint boundary surface between the first member and the second member can be suppressed.

DESCRIPTION OF EMBODIMENTS

Description of Embodiments of Invention

Firstly, embodiments of the present invention will be listed and described.

<1> A joined component according to an embodiment is obtained by joining, with brazing filler metal, a first member and a second member to each other at a joint boundary surface where the first member and the second member are in contact with each other, the joined component having a non-contact area that is provided on an inner side with respect to an outer peripheral line of the joint boundary surface and in which the first member and the second member are not in contact with each other. The first member has a retaining recess where the brazing filler metal that is melted when the first member and the second member are joined to each other is retained, the retaining recess providing the non-contact area.

The molten brazing filler metal including some solidified part forms a brazing-filler-metal pool in the retaining recess.

In the above joined component, there is no dripping of the brazing filler metal that has overflowed from the outer peripheral line of the first member or no trace of removal of such dripping of the brazing filler metal at any position along the outer peripheral line. This is because the first member has the retaining recess. Referring to the detailed description of a method for manufacturing a joined component that will be given below, if the first member has the retaining recess, molten brazing filler metal is first retained in the retaining recess and then flows into the joint boundary surface when the two members are joined to each other. Consequently, the forcing of the molten brazing filler metal into the joint boundary surface can be suppressed. Accordingly, the penetration of an excessive amount of brazing filler metal into the joint boundary surface between the first member and the second member can be suppressed. Hence, the above dripping of the brazing filler metal can be suppressed.

<2> A modification of the joined component according to the embodiment can be provided in which the surface of the brazing-filler-metal pool includes a part that is at or below the joint boundary surface.

The state where the surface of the brazing-filler-metal pool includes a part that is at or below the joint boundary surface is regarded as one of explicit evidences for the fact that no penetration of an excessive amount of brazing filler metal from the retaining recess into the joint boundary surface, as to be described in the embodiment.

<3> Another modification of the joined component according to the embodiment can be provided in which the retaining recess has a depth of 0.3 mm or greater.

If the retaining recess has a depth (at the maximum) of 0.3 mm or greater, a satisfactory amount of molten brazing filler metal can be retained in the retaining recess when the first member and the second member are joined to each other. Consequently, the penetration of an excessive amount of brazing filler metal from the retaining recess into the joint boundary surface can be suppressed.

<4> Another modification of the joined component according to the embodiment can be provided in which the second member has a corresponding recess or a corresponding hole provided at a position corresponding to the retaining recess.

If the second member has the corresponding recess or the corresponding hole, a space having a satisfactory capacity for receiving the brazing filler metal can be provided above the retaining recess when the joined component is manufactured. Hence, a satisfactory amount of brazing filler metal can be provided at the position corresponding to the retaining recess when the joined component is manufactured.

<5> Another modification of the joined component according to the embodiment can be provided in which a sidewall surface of the retaining recess that is continuous with the joint boundary surface forms an inclined surface.

If the sidewall surface of the retaining recess forms an inclined surface, the movement of the brazing filler metal from the retaining recess to the joint boundary surface can be facilitated when the first member and the second member are joined to each other.

<6> Another modification of the joined component according to the embodiment can be provided in which the first member and the second member are each a sintered body.

The joined component including the first member and the second member that are each a sintered body is applicable to various fields. This is because a sintered body has excellent heat resistance and strength. Furthermore, a sintered body has a number of voids. The brazing filler metal enters those voids, whereby a joined component in which the first member and the second member are joined to each other very firmly is provided.

<7> A method for manufacturing a joined component according to another embodiment is a method for manufacturing a joined component obtained by joining a first joint surface on one side of a first member and a second joint surface on one side of a second member to each other with brazing filler metal. The method includes the following steps α to γ:

a step α of preparing the first member having a retaining recess in the first joint surface;

a step β of placing the brazing filler metal onto the first member in an area on an inner side with respect to an outer peripheral line of the retaining recess and bringing the second joint surface of the second member into contact with the first joint surface of the first member; and a step γ of melting the brazing filler metal by performing heat treatment.

Molten brazing filler metal that is temporarily retained in the retaining recess in the step γ enters a gap between the first joint surface and the second joint surface, and the brazing filler metal joins the first joint surface and the second joint surface to each other.

In the above method for manufacturing a joined component, the penetration of an excessive amount of brazing filler metal into the gap (the joint boundary surface) between the first joint surface and the second joint surface can be suppressed. This is because of the following reason. In the above method for manufacturing a joined component, the molten brazing filler metal is temporarily retained in the retaining recess during the heat treatment, and the molten brazing filler metal is then supplied from the retaining recess to the joint boundary surface. Since the penetration of an excessive amount of brazing filler metal into the joint boundary surface is suppressed, the overflow of brazing filler metal from the outer peripheral line of the joint boundary surface can be suppressed effectively. Accordingly, a joined component with no dripping of brazing filler metal at any positions along the outer peripheral line can be manufactured.

<8> A modification of the method for manufacturing a joined component according to the embodiment can be provided in which the following condition is satisfied: $1.5 \leq W/(V \times D) \leq 5$, where D denotes a true density of the brazing filler metal, W denotes a mass of the brazing filler metal that is placed onto the first member in the step β, and V denotes a capacity of the retaining recess. Note that D is in $g/cm^3$, W is in g, and V is in $mm^3$.

If the amount of brazing filler metal to be placed onto the first member is adjusted such that the above inequality is satisfied, the brazing filler metal can be spread all over the joint boundary surface.

<9> Another modification of the method for manufacturing a joined component according to the embodiment can be provided in which the retaining recess has a depth of 0.3 mm or greater.

If the retaining recess has a depth (at the maximum) of 0.3 mm or greater, a satisfactory amount of molten brazing filler metal can be retained in the retaining recess. Hence, the penetration of molten brazing filler metal all at once into the joint boundary surface can be suppressed. Consequently, the penetration of an excessive amount of brazing filler metal from the retaining recess into the joint boundary surface can be suppressed.

Detailed Description of Embodiments of Invention

Details of the embodiments of the present invention will now be described with reference to the drawings. Note that the present invention is not limited to such exemplary embodiments and is defined by the appended claims. It is intended to encompass all changes that are made within the scope of the claims and equivalents thereof.

First Embodiment

<<Joined Component>>

Figure 1:
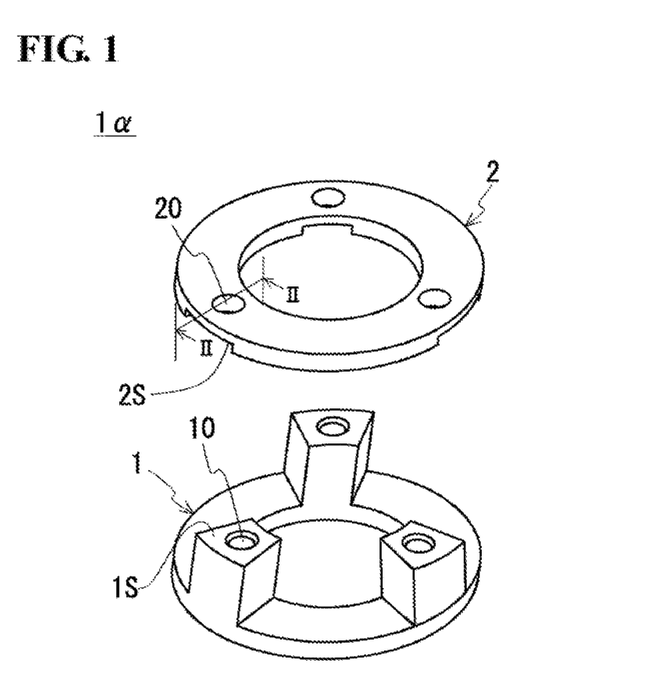
FIG. 1 is an exploded perspective view of a joined component according to a first embodiment.

A joined component 1α illustrated in FIG. 1 is obtained by joining a first member 1 and a second member 2 to each other with brazing filler metal (FIG. 1 illustrates the two members 1 and 2 that are separated from each other). There are two major differences between the joined component 1α and the known joined component: [1] The first member 1 has retaining recesses 10; and [2] There is no dripping of the brazing filler metal or no trace of removal of such dripping of the brazing filler metal at any position along the outer peripheral line of a joint boundary surface between the first member 1 and the second member 2. Now, elements included in the joined component 1α will be described in detail.

[First Member]

The first member 1 illustrated in FIG. 1 has a configuration in which three pillar-like portions are provided on one side of a ring. Of course, the shape of the first member 1 is not limited to the shape illustrated in FIG. 1. In this case, the end surfaces of the respective pillar-like portions of the first member 1 each form a first joint surface 1S to be joined to the second member 2, which has a ring shape and will be described below. That is, the first joint surface 1S is a joining area (an area excluding non-contact areas R1 to be described below with reference to FIG. 2) to be joined to the second member 2. The first joint surface 1S has the retaining recess 10 in the center thereof. The retaining recess 10 is a concave portion whose bottom is lower than lowest part of the first joint surface 1S as the joining area. For example, the first joint surface 1S may have the grooves disclosed by PTL 1. In that case, the retaining recess 10 is deeper than the grooves.

The number and the positions of retaining recesses 10 provided in the first member 1 and the plan-view shape of the outline of each retaining recess 10 are not specifically limited. The plan-view shape of the outline of the retaining recess 10 may be, for example, an oval shape including a circular shape as illustrated in FIG. 1, a polygonal shape including a rectangular shape, or any other shape such as a star-like shape. Moreover, as to be described below in third and fourth embodiments (FIGS. 5 and 6), the retaining recess 10 may have a ring shape in plan view.

The length from an extension of the joint boundary surface to the deepest point of the retaining recess 10 is preferably 0.3 mm or greater. If the retaining recess 10 is shallow, such a retaining recess 10 might not be able to retain a satisfactory amount of brazing filler metal when the first member 1 and the second member 2 are joined to each other.

Figure 2:
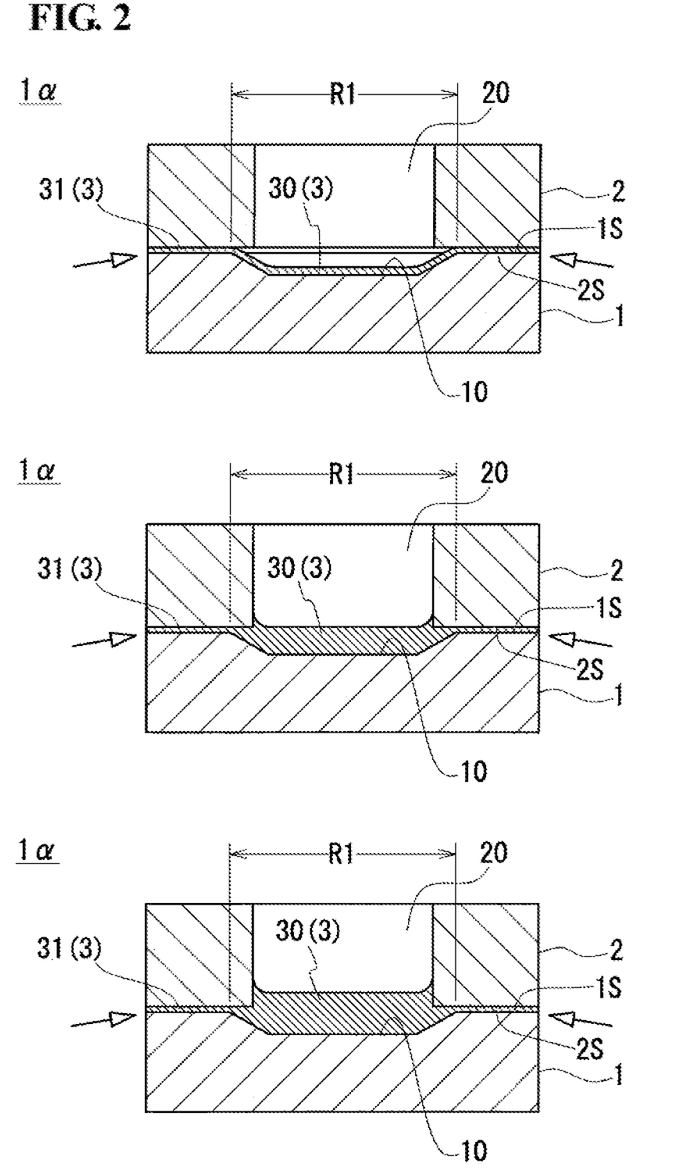
FIG. 2 includes schematic diagrams illustrating different states of joint between a first member and a second member included in the joined component according to the first embodiment.

The retaining recess 10 may have a shape that is uniform from the mouth thereof to the bottom thereof or may have a bowl-like shape. The retaining recess 10 according to the first embodiment has a bowl-like shape as illustrated in FIG. 2 to be referred to later. In such a case, the inclination of the sidewall surface of the retaining recess 10 that is continuous with the joint boundary surface, that is, the angle (the angle of inclination) between the extension of the joint boundary surface and the sidewall surface is preferably about 30° or greater and 85° or smaller. More preferably, the angle of inclination is 40° or greater and 80° or smaller. Much more preferably, the angle of inclination is 50° or greater and 75° or smaller.

The first member 1 may be either a sintered body obtained by sintering a powder compact, or a cast body. The sintered body may be, for example, a Fe—Cu—C sintered body.

[Second Member]

The second member 2 illustrated in FIG. 1 is a ring-shaped member. The second member 2 has depressions into which ends of pillar-like portions of the first member 1 are fitted, respectively. The bottom surface of each of the depressions forms a second joint surface 2S to be brought into contact with the first member 1. The second joint surface 2S has a through hole (corresponding hole) 20 at a position corresponding to the retaining recess 10 of the first member 1. The through hole 20 passes through the second member 2 in the thickness direction of the ring.

As with the first member 1, the second member 2 may be either a sintered body obtained by sintering a powder compact, or a cast body. The sintered body may be, for example, a Fe—Cu—C sintered body.

[Brazing Filler Metal]

The brazing filler metal that joins the first joint surface 1S of the first member 1 and the second joint surface 2S of the second member 2 to each other is not specifically limited, as long as the brazing filler metal in a molten state is hydrophilic to the two members 1 and 2. If the molten brazing filler metal is hydrophilic to the two members 1 and 2, the surface of the molten brazing filler metal forms a concave meniscus whose central part is positioned at a lower level and whose outer part is positioned at a higher level. Examples of such brazing filler metal include Ni—Cu—Mn—Fe brazing filler metal and Ni—Cu—Mn—Si—B brazing filler metal.

Specifically, the brazing filler metal may be composed of 40% of Ni by mass, 40% of Cu by mass, 15% of Mn by mass, 1.7% of Si by mass, and 1.5% of B by mass, with a true density of 8.4 g/cm$^3$. The viscosity of the molten brazing filler metal containing Cu by a great percentage is about the same as or lower than that of water.

[State of Joint]

The state of joint between the first member 1 and the second member 2 will be described with reference to FIG. 2. FIG. 2 includes schematic diagrams of the first member 1 and the second member 2 illustrated in FIG. 1 that are joined to each other, the diagrams each illustrating a section taken along line II-II. As a matter of convenience, FIG. 2 illustrates as if a gap is provided at the joint between the first member 1 and the second member 2. Actually, however, the joint surfaces 1S and 2S of the two members 1 and 2 are in contact with each other. FIG. 2 illustrates three states with different amounts of brazing filler metal 3 that joins the first member 1 and the second member 2 to each other.

As illustrated in the top one of the diagrams in FIG. 2, the joined component 1α obtained by joining the first member 1 and the second member 2 to each other includes non-contact areas R1 where the first member 1 and the second member 2 are not in contact with each other. The non-contact areas R1 are provided at positions corresponding to the respective retaining recesses 10. The brazing filler metal 3 can be broken down into a brazing-filler-metal pool 30 that is pooled in the retaining recess 10, and a brazing-filler-metal joining portion 31 that is present at the joint boundary surface between the first joint surface 1S and the second joint surface 2S. The surface of the brazing-filler-metal pool 30 is depressed while substantially conforming to the shape of the bottom surface of the retaining recess 10, and the depressed part is at a level below the joint boundary surface. Meanwhile, the brazing-filler-metal joining portion 31 spreads all over the joint boundary surface and firmly joins the first member 1 and the second member 2 to each other at every position of the joint boundary surface.

There is no dripping of the brazing filler metal 3 or no trace of removal of such dripping of the brazing filler metal at any position along the outer peripheral line of the first member 1 (see the white arrows). This is because the first member 1 has the retaining recess 10 as to be described below regarding a method for manufacturing the joined component 1α. Consequently, the penetration of an excessive amount of brazing filler metal 3 into the joint boundary surface between the first member 1 and the second member 2 is suppressed.

In the joined component 1α illustrated in the middle one of the diagrams in FIG. 2, the surface of the brazing-filler-metal pool 30 pooled in the retaining recess 10 is substantially flush with the joint boundary surface. The surface of the brazing-filler-metal pool 30 in the through hole 20 is raised at the edge thereof. This is because of the surface tension of the brazing filler metal 3 that occurs when the first member 1 and the second member 2 are joined to each other. The part excluding the brazing-filler-metal pool 30 is the same as in the top diagram of FIG. 2.

In the joined component 1α illustrated in the bottom one of the diagrams in FIG. 2, the surface of the brazing-filler-metal pool 30 pooled in the retaining recess 10 is positioned at a level higher than the joint boundary surface by about 0.5 mm. If the level of the brazing-filler-metal pool 30 becomes much higher than the joint boundary surface (for example, by about 1 mm or greater), the probability of dripping of the brazing filler metal 3 at any position along the outer peripheral line (see the white arrows) increases. In the example illustrated in the bottom diagram also, the surface of the brazing-filler-metal pool 30 in the through hole 20 is raised at the edge thereof. The part excluding the brazing-filler-metal pool 30 is the same as in the top diagram of FIG. 2.

<<Method for Manufacturing Joined Component>>

The above joined component 1α can be manufactured by a method for manufacturing a joined component that includes the following steps α to γ. Now, an exemplary method for manufacturing the joined component 1α illustrated in the top diagram of FIG. 2 will be described.

The description will be given with reference to FIG. 3.

[Step α]

Figure 3:
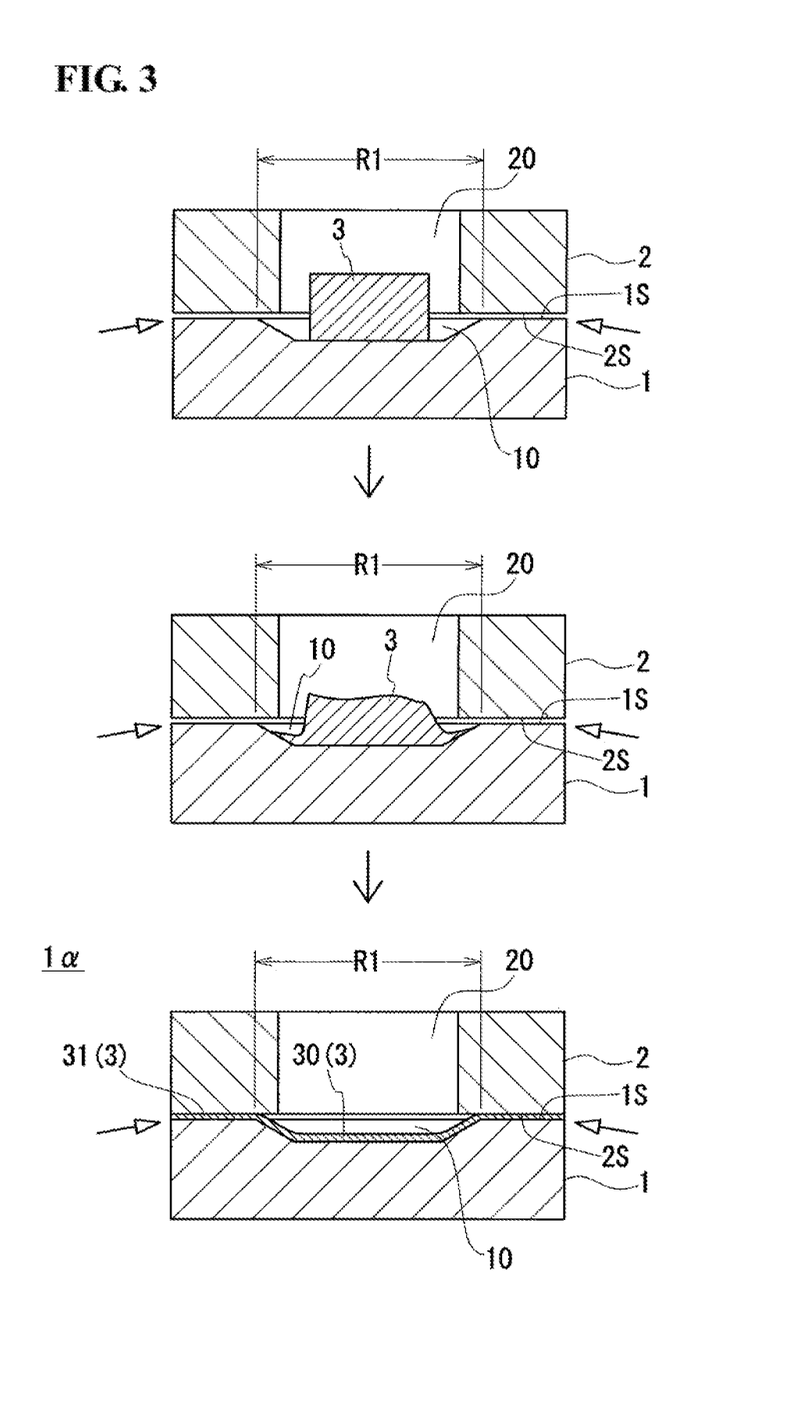
FIG. 3 includes diagrams illustrating a method for manufacturing the joined component according to the first embodiment.

As illustrated in the top one of the diagrams in FIG. 3, in the step α, a first member 1 having a retaining recess 10 in a first joint surface 1S thereof is prepared. The first member 1 may be either a sintered body or a cast body. Moreover, the first member 1 may be either a powder compact that is yet to be sintered. The depth of the retaining recess 10 of the first member 1 is preferably set to 0.3 mm or greater.

[Step β]

In the step β, a piece of brazing filler metal 3 is placed on the first member 1 in an area on the inner side of the outer peripheral line of the retaining recess 10, and a second joint surface 2S of a second member 2 is brought into contact with the first joint surface 1S of the first member 1 (FIG. 3 illustrates as if there is a gap between the two members 1 and 2). In the present embodiment, the second member 2 has, at a position corresponding to the retaining recess 10 of the first member 1, a through hole (corresponding hole) 20 extending through the second member 2 in the thickness direction. Therefore, after the second member 2 is brought into contact with the first member 1, the piece of brazing filler metal 3 can be placed in the retaining recess 10 through the through hole 20. Of course, the second member 2 may be brought into contact with the first member 1 after the piece of brazing filler metal 3 is placed in the retaining recess 10 of the first member 1. With the presence of the through hole 20, a piece of brazing filler metal 3 having a thickness greater than the depth of the retaining recess 10 can be easily placed in the retaining recess 10.

The second member 2 may be any of a sintered body, a powder compact that is yet to be sintered, and a cast body.

From the viewpoint of providing a satisfactory joining area between the two members 1 and 2, the size of the through hole 20 provided in the second member 2 is preferably the same as or smaller than the size of the mouth of the retaining recess 10 provided in the first member 1.

The amount of the piece of brazing filler metal 3 to be placed in the retaining recess 10 in the step β may be determined in accordance with the area of the joint boundary surface. The amount of the piece of brazing filler metal 3 to be placed only needs to be such a amount that the brazing filler metal 3 in the molten state to be described below can spread all over the joint boundary surface (the amount is hereinafter referred to as the required amount). From the viewpoint of providing a satisfactory joining area, the amount of the piece of brazing filler metal 3 to be placed is preferably 1.1 to 2 times the above required amount. Moreover, the amount of the piece of brazing filler metal 3 to be placed may be determined such that an inequality of $1.5 \leq W/(V \times D) \leq 5$ is satisfied, or may be the same as or greater than the capacity of the retaining recess 10. Note that "D" denotes the true density (g/cm³) of the brazing filler metal 3, "W" denotes the mass (g) of the brazing filler metal 3, and V denotes the capacity (mm³) of the retaining recess 10.

[Step γ]

As illustrated in the middle diagram in FIG. 3, in the step γ, the piece of brazing filler metal 3 is melted by heat treatment. In the heat treatment, molten brazing filler metal 3 is temporarily retained in the retaining recess 10. That is, molten brazing filler metal 3 is not directly fed into the joint boundary surface but is first temporarily stored in the retaining recess 10. The peripheral edge of the molten brazing filler metal 3 that is in contact with the sidewall surface of the first member 1 is raised higher than the central part of the brazing filler metal 3 because of the effect of wetting (the surface of the brazing filler metal 3 forms a concave meniscus). In the present embodiment, during a process from the melting of the piece of brazing filler metal 3 until the solidification of the brazing filler metal 3 fed into the joint boundary surface, the surface of the molten brazing filler metal 3 (excluding the unsolidified portion) excluding the peripheral edge is positioned below the joint boundary surface. When the peripheral edge of the molten brazing filler metal 3 reaches the joint boundary surface between the first member 1 and the second member 2, the molten brazing filler metal 3 is taken into the joint boundary surface by the capillary action. As long as the peripheral edge reaches the joint boundary surface, the brazing filler metal 3 is fed into the joint boundary surface by the capillary action even if the surface of the molten brazing filler metal 3 excluding the peripheral edge is positioned below the joint boundary surface. That is, the surface level of the brazing filler metal 3 in the retaining recess 10 is raised in the retaining recess 10 and reaches the joint boundary surface under the surface tension, whereby the brazing filler metal 3 is fed into the joint boundary surface. What is important is this process in which the surface level of the molten brazing filler metal 3 is raised from a position below the joint boundary surface and then reaches the joint boundary surface, and this process is different from a process of feeding the molten brazing filler metal 3 into the joint boundary surface in a state where the surface level of the molten brazing filler metal 3 is flush with or is positioned above the joint boundary surface from the beginning of the melting step. Unlike the present embodiment, if the surface level of the brazing filler metal 3 is positioned much higher than the joint boundary surface, the molten brazing filler metal 3 is forced into the joint boundary surface under the liquid pressure thereof, and the brazing filler metal 3 may drip from any position along the outer peripheral line of the first member 1 (see the white arrows).

The above heat treatment is performed at a temperature higher than the melting temperature of the brazing filler metal 3. For example, the temperature that is set in the heat treatment is preferably higher than the melting temperature by 10° C. or more. If the first member 1 and the second member 2 are each a powder compact, the temperature for the heat treatment is set to the temperature at which the first member 1 and the second member 2 are sintered. For example, in the case of a Fe—Cu—C powder compact, the heat treatment is performed at a temperature of 1100° C. to 1200° C. inclusive and for a period of 10 minutes to 30 minutes inclusive. The sintering temperature may be considered to be higher than the melting point of the brazing filler metal 3. Hence, the temperature for the heat treatment may be determined with reference to the sintering temperature.

As described above, if the molten brazing filler metal 3 is temporarily retained in the retaining recess 10 during the heat treatment and is then fed into the joint boundary surface from the retaining recess 10 as illustrated in the middle diagram in FIG. 3, the penetration of an excessive amount of brazing filler metal 3 into the joint boundary surface can be suppressed as illustrated in the bottom diagram in FIG. 3. Consequently, a joined component 1α having no dripping of the brazing filler metal 3 at any position along the outer peripheral line of the first member 1 (see the white arrows) can be manufactured. Moreover, since there is no dripping of the brazing filler metal 3 in the joined component 1α, there is no trace of removal of such dripping of the brazing filler metal.

Second Embodiment

Figure 4:
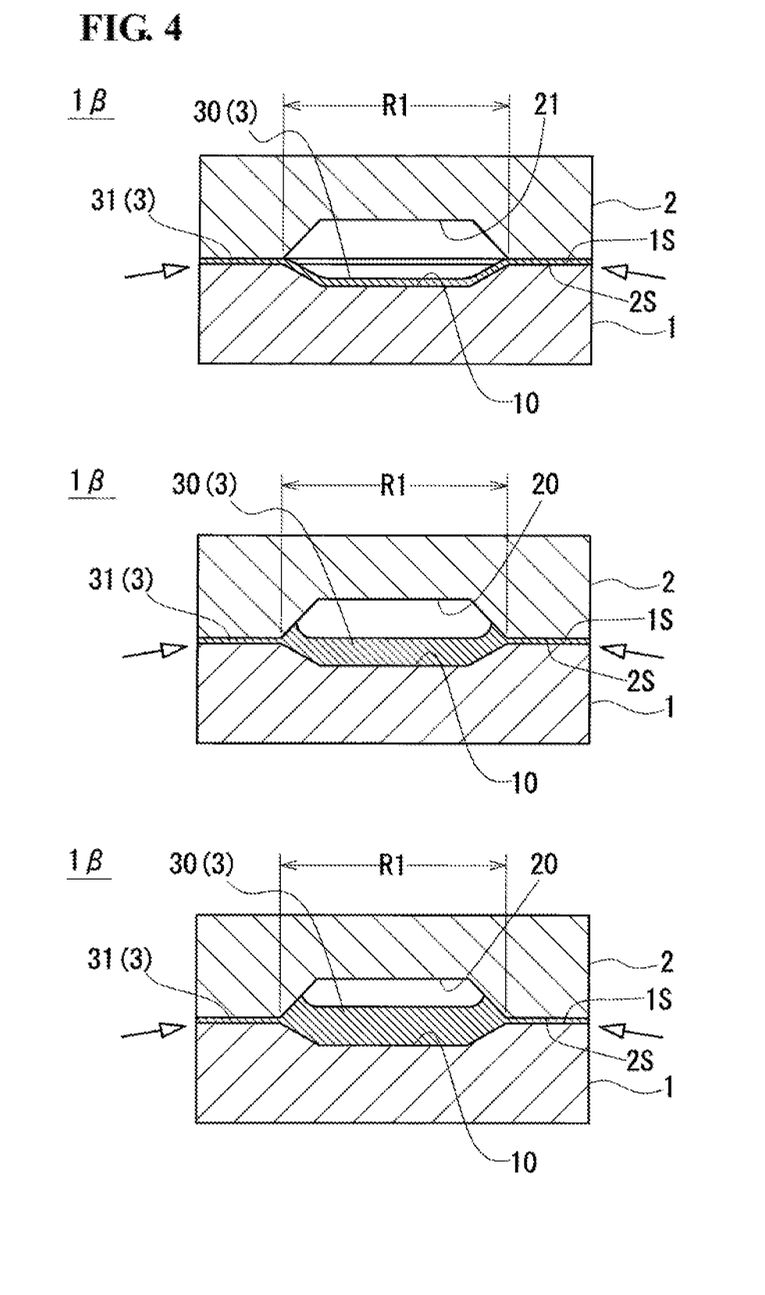
FIG. 4 includes schematic diagrams illustrating different states of joint between a first member and a second member included in a joined component according to a second embodiment.

A second embodiment in which the second member 2 has a corresponding recess 21 provided at a position corresponding to the retaining recess 10 of the first member 1 will now be described with reference to FIG. 4. The top diagram, the middle diagram, and the bottom diagram in FIG. 4 illustrate a joined component 1β in which the surface level of the brazing-filler-metal pool 30 in the retaining recess 10 is below the joint boundary surface, a joined component 1β in which the surface level of the brazing-filler-metal pool 30 in the retaining recess 10 is substantially flush with the joint boundary surface, and a joined component 1β in which the surface level of the brazing-filler-metal pool 30 in the retaining recess 10 is slightly above the joint boundary surface, respectively. The other details of the joined components 1β excluding the surface level of the brazing-filler-metal pool 30 are the same.

Since the second member 2 has the corresponding recess 21, the brazing filler metal 3 can be made invisible from the outside. The depth of the corresponding recess 21 may be determined appropriately. If the depth of the corresponding recess 21 is increased, a larger piece of brazing filler metal 3 can be placed in the retaining recess 10 of the first member 1 when the first member 1 and the second member 2 are joined to each other.

To manufacture any of the joined components 1β illustrated in FIG. 4, a piece of brazing filler metal 3 is first placed in the retaining recess 10 of the first member 1, and the second joint surface 2S of the second member 2 is then brought into contact with the first joint surface 1S of the first member 1. Subsequently, heat treatment is given to the resulting body, whereby the first member 1 and the second member 2 are joined to each other with the brazing filler metal 3 (the brazing-filler-metal joining portion 31).

Third Embodiment

Figure 5:
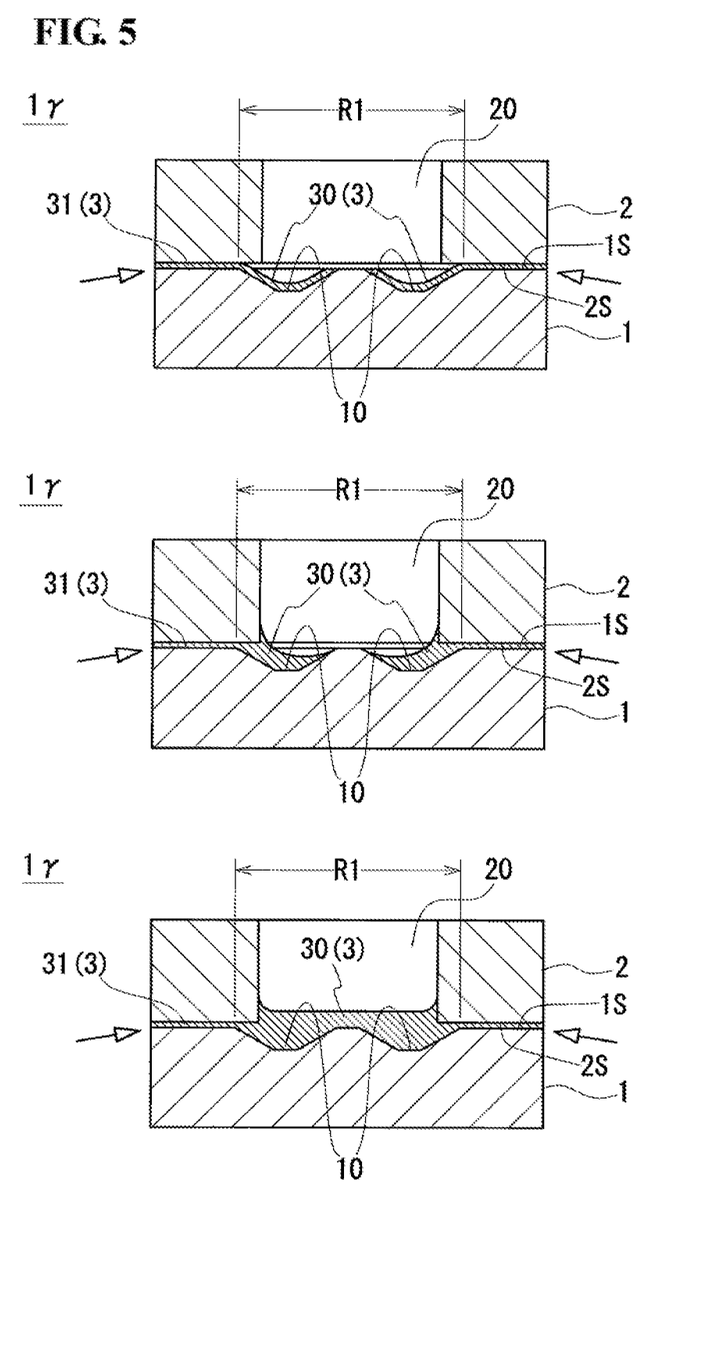
FIG. 5 includes schematic diagrams illustrating different states of joint between a first member and a second member included in a joined component according to a third embodiment.

A third embodiment in which the retaining recess 10 provided in the first member 1 has a ring shape will now be described with reference to FIG. 5. The top diagram, the middle diagram, and the bottom diagram in FIG. 5 illustrate a joined component 1γ in which the surface level of the brazing-filler-metal pool 30 in the retaining recess 10 is below the joint boundary surface, a joined component 1γ in which the surface level of the brazing-filler-metal pool 30 in the retaining recess 10 is substantially flush with the joint boundary surface, and a joined component 1γ in which the surface level of the brazing-filler-metal pool 30 in the retaining recess 10 is slightly above the joint boundary surface, respectively. The other details of the joined components 1γ excluding the surface level of the brazing-filler-metal pool 30 are the same.

Since the retaining recess 10 has a ring shape, the amount of brazing-filler-metal pool 30 that remains in the retaining recess 10 can be reduced. That is, the amount of brazing filler metal 3 that is irrelevant to the joining of the first member 1 and the second member 2 can be reduced.

The inner wall surface of the ring-shaped retaining recess 10 that is on the outer peripheral side preferably forms an inclined surface as in the first and second embodiments. Furthermore, the inner wall surface of the ring-shaped retaining recess 10 that is on the inner peripheral side may also form an inclined surface.

To manufacture any of the joined components 1γ illustrated in FIG. 5, a piece of brazing filler metal 3 is preferably placed on a land portion of the first member 1 that is encircled by the retaining recess 10. By placing the piece of brazing filler metal 3 on the land portion, molten brazing filler metal 3 flows into the ring-shaped retaining recess 10 in such a manner as to be distributed over the entirety of the retaining recess 10. Consequently, the occurrence of a situation where the amount of brazing filler metal 3 in the retaining recess 10 becomes large at some positions can be avoided. Therefore, after a satisfactory amount of molten brazing filler metal 3 is retained in the retaining recess 10, the brazing filler metal 3 is introduced into the joint boundary surface. In this case, if the inner wall surface of the ring-shaped retaining recess 10 that is on the inner peripheral side forms an inclined surface, the brazing filler metal 3 can be distributed from the land portion substantially evenly over the entirety of the retaining recess 10. While the present embodiment concerns a case where the top of the land portion is positioned at the same level as the joint boundary surface, the top of the land portion may be positioned either above or below the joint boundary surface.

Fourth Embodiment

Figure 6:
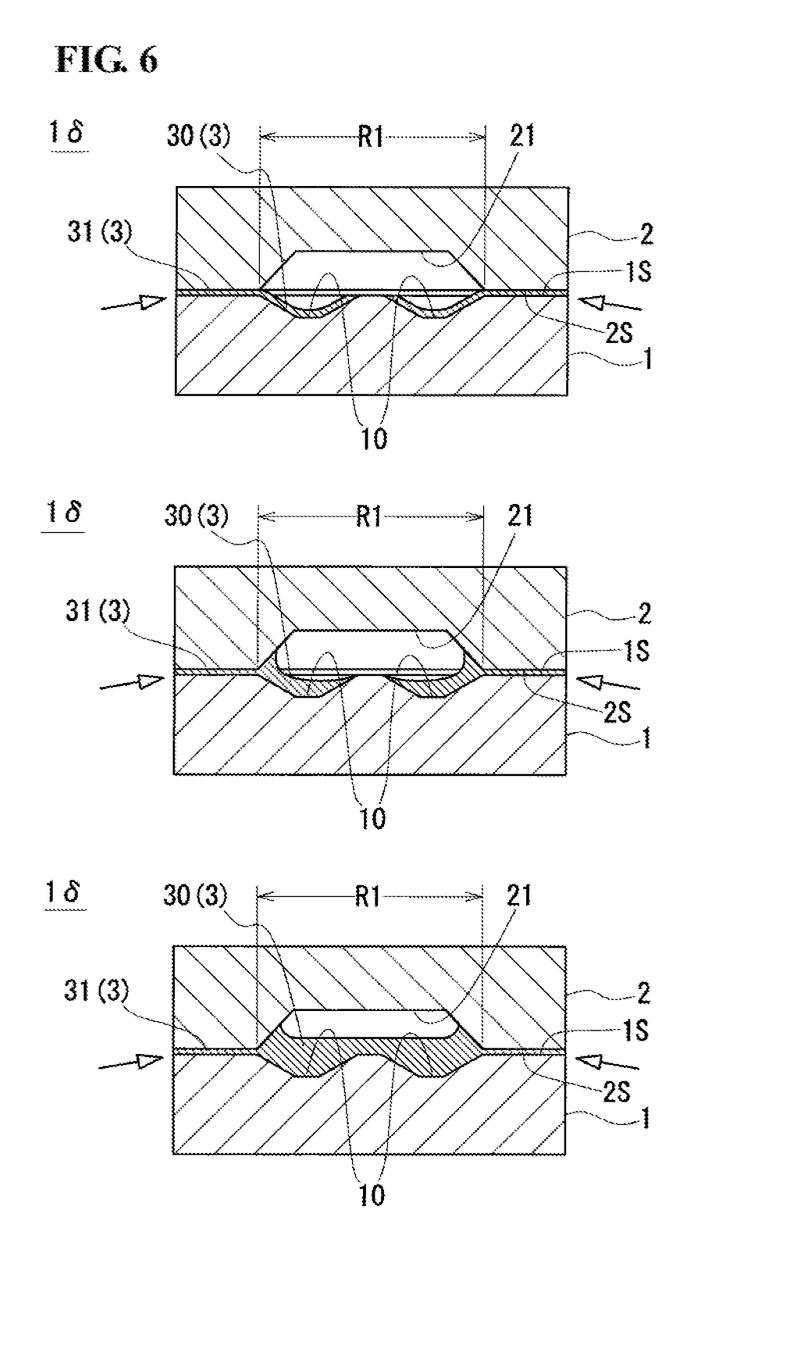
FIG. 6 includes schematic diagrams illustrating different states of joint between a first member and a second member included in a joined component according to a fourth embodiment.

As illustrated in FIG. 6, the first member 1 having the ring-shaped retaining recess 10 employed in the third embodiment (see FIG. 5) and the second member 2 having the corresponding recess 21 employed in the second embodiment may be combined together into a joined component 1δ. The top diagram, the middle diagram, and the bottom diagram in FIG. 6 illustrate a joined component 1δ in which the surface level of the brazing-filler-metal pool 30 in the retaining recess 10 is below the joint boundary surface, a joined component 1δ in which the surface level of the brazing-filler-metal pool 30 in the retaining recess 10 is substantially flush with the joint boundary surface, and a joined component 1δ in which the surface level of the brazing-filler-metal pool 30 in the retaining recess 10 is slightly above the joint boundary surface, respectively. The other details of the joined components 1δ excluding the surface level of the brazing-filler-metal pool 30 are the same.

In the present embodiment, the advantageous effects produced in the second embodiment and the advantageous effects produced in the third embodiment can both be obtained.

Experimental Example

In an experimental example, the joined component 1α, illustrated in FIG. 2, obtained by joining the first member 1 and the second member 2 to each other with the brazing filler metal 3 was actually manufactured. Specifically, a plurality of joined components 1α (Samples No. 2 to 6) each obtained by joining the first member 1 and the second member 2 together were manufactured such that the retaining recesses 10 thereof have different depths. Furthermore, as a comparative example, a joined component (Sample No. 1) obtained by joining a first member 1 having no retaining recesses and the second member to each other was manufactured. These joined components were inspected with regard to the state of penetration of the brazing filler metal into the joint boundary surface, the overflow of the brazing filler metal from an open end of the joint boundary surface (i.e., the outer peripheral line indicated by the white arrows in FIG. 2), and the surface level of the brazing filler metal.

For each of Samples No. 2 to 6, the plan-view area of the retaining recess 10 was set to 40 mm$^2$, and the area of the joint boundary surface was set to 2.77 cm$^2$. The area of the joint boundary surface for Sample No. 1 having no retaining recesses was also set to 2.77 cm$^2$. The brazing filler metal 3 was composed of Ni, Cu, Mn, and Fe and had a true density D of about 8.4 g/cm$^3$. Manufacturing conditions for each of the samples are summarized in Table 1.

TABLE 1

| | Retaining recess | | Brazing filler metal | | | |
|---|---|---|---|---|---|---|
| Sample No. | Depth H [mm] | Capacity V [mm$^3$] | Amount corresponding to capacity of retaining recess V*D [g] | Fed amount W [g] | Required amount Wth [g] | Relational expression W/(V*D) |
| 1 | 0 | 0 | 0.00 | 0.50 | 0.30 | — |
| 2 | 0.3 | 12 | 0.10 | 0.50 | 0.30 | 5.0 |
| 3 | 0.5 | 20 | 0.17 | 0.50 | 0.30 | 3.0 |
| 4 | 0.8 | 32 | 0.27 | 0.50 | 0.30 | 1.9 |
| 5 | 1.0 | 40 | 0.33 | 0.50 | 0.30 | 1.5 |
| 6 | 1.2 | 48 | 0.40 | 0.50 | 0.30 | 1.3 |

The items listed in Table 1 have the following meanings, respectively.

The depth H (mm) refers to the shortest distance from the plane of the joint boundary surface that was extended over the non-contact area R1 to the deepest point of the retaining recess 10.

The capacity V (mm$^3$) refers to the volume of a portion defined by the above plane and the retaining recess 10, that is, the capacity of the retaining recess 10.

The amount corresponding to the capacity of the retaining recess V×D (g) refers to the mass of the brazing filler metal 3 corresponding to the capacity of the retaining recess 10.

The fed amount W (g) refers to the mass of the brazing filler metal 3 to be placed on the first member 1 in the process of manufacturing the joined component and was 0.50 g in this experiment.

The required amount Wth (g) refers to the mass of the brazing filler metal required to firmly join the first member 1 and the second member 2 over the entirety of the joint boundary surface (having an area of 2.77 cm$^2$) and was 0.30 g in this experiment.

The relational expression provided an index for determining a preferable amount of brazing filler metal 3 to be fed and expressed the fed amount W (g) divided by the amount V×D (g).

Each of the samples was manufactured in accordance with the method for manufacturing a joined component described in the first embodiment. The first member 1 and the second member 2 that were yet to be joined to each other were each a powder compact. The heat treatment for the brazing filler metal 3 was performed in the process of sintering the first member 1 and the second member 2. The heat treatment was performed at a temperature (a sintering temperature) of 1100 to 1200° C. and for a period of 15 minutes.

The samples thus obtained were each cut along a line to have a section orthogonal to the joint boundary surface, and whether or not the brazing filler metal had spread all over the joint boundary surface was inspected. If there were any areas having no brazing filler metal at the joint boundary surface in the section of the sample, it was determined that the state of joint was poor. If the brazing filler metal was present all over the joint boundary surface in the section of the sample, it was determined that the state of joint was satisfactory. Furthermore, the open end of the joint boundary surface of each of the samples was visually observed, and whether or not there is any overflow of the brazing filler metal from the open end was inspected. Furthermore, observing the section of each of the samples, the surface level of the brazing filler metal 3 in the central part of the brazing-filler-metal pool 30 with respect to the joint boundary surface was identified. The results of this inspection are summarized in Table 2.

TABLE 2

| Sample No. | Spreading of brazing filler metal over joint boundary surface | Overflow of brazing filler metal from open end | Relationship between surface level of brazing filler metal and joint boundary surface |
|---|---|---|---|
| 1 | Good | Yes | Surface level of brazing filler metal was higher |
| 2 | Good | No | Substantially flush with each other |
| 3 | Good | No | Surface level of brazing filler metal was lower |
| 4 | Good | No | Surface level of brazing filler metal was lower |
| 5 | Good | No | Surface level of brazing filler metal was lower |
| 6 | Poor | No | Surface level of brazing filler metal was lower |

As summarized in Table 2, in the case of Sample No. 1, the brazing filler metal spread all over the joint boundary surface but overflowed from the open end, causing some dripping of the brazing filler metal. It is considered that since the first member had no retaining recesses, molten brazing filler metal was forced into the joint boundary surface under its own weight during the heat treatment. Such a situation is evidenced by the fact that, in the case of Sample No. 1, the surface level of the solidified brazing filler metal was higher than the joint boundary surface. The surface level of the brazing filler metal in the molten state is higher than the surface level of the brazing filler metal in the solidified state. Therefore, it is considered that an excessive amount of brazing filler metal was fed into the joint boundary surface.

In each of the cases of Samples No. 2 to 5, the brazing filler metal spread all over the joint boundary surface, with no dripping of brazing filler metal from the open end. The values of the expression W/(V×D) for the respective samples ranged 1.5 to 5, as summarized in Table 1. Meanwhile, in the case of Sample No. 6, although some areas of the joint boundary surface were not filled with the brazing filler metal, no dripping of brazing filler metal from the open end was observed. The value of the expression W/(V×D) for this sample was 1.3, as summarized in Table 1. These results shows that the value of the expression W/(V×D) is preferably 1.5 to 5.

The above samples were also put to a release test for the first member and the second member. Specifically, a test in which the first member and the second member were pulled in opposite directions that were perpendicular to the joint boundary surface and were away from each other. Consequently, in the cases of Samples No. 1 to No. 5, almost the same degree of force was required to release the second member from the first member. Moreover, the first member and the second member were joined to each other so firmly that part of the first member and part of the second member near the joint boundary surface were broken when the two were released from each other. That is, the joining strength between the first member and the second member was higher than the strength of the material forming the first and second members. Meanwhile, in the case of Sample No. 6, the second member was able to be released from the first member with a force about 90% of that required in the cases of Samples No. 1 to No. 5. In the case of Sample No. 6 also, the first member and the second member were joined to each other so firmly that part of the first member and part of the second member near the joint boundary surface were broken. This means that a high degree of joining strength is also provided in the case of Sample No. 6. Therefore, it can be considered that Sample No. 6 is superior to Sample No. 1 in terms of causing no leakage of the brazing filler metal.

INDUSTRIAL APPLICABILITY

The joined component according to the present invention can be suitably employed as one of the elements included in a complicated mechanism such as a pump or a compressor. Furthermore, the method for manufacturing a joint component according to the present invention can be suitably employed as a method for manufacturing the above joined component.

REFERENCE SIGNS LIST

1α, 1β, 1γ, 1δ joined component
R1 non-contact area
1 first member
1S first joint surface
10 retaining recess
2 second member
2S second joint surface
20 through hole (corresponding hole)
21 corresponding recess
3 brazing filler metal
30 brazing-filler-metal pool
31 brazing-filler-metal joining portion

The invention claimed is:

1. A joined component obtained by joining with brazing filler metal a first member and a second member to each other at a joint surface, comprising:
the first member comprising a plurality of pillars axially extending from an inner face thereof, each pillar defining a joint surface having a retaining recess formed therein;
wherein each retaining recess has a bottom surface, an outer annular sidewall and an inner annular sidewall, wherein the outer annular sidewall surrounds and connects with the bottom surface, and the inner annular sidewall is opposite to the outer annular sidewall and connects with the bottom surface; and the second member comprising a plurality of grooves formed within an inner face thereof, the grooves being correspondingly shaped to receive the pillars therein, each groove defining a joint surface having a through hole defining a sidewall extending therethrough in a position corresponding to a respective one of the retaining recess;

wherein brazing filler metal is placed within the retaining recesses and the pillars are received within the grooves such that the joint surfaces of corresponding pillars and grooves are spaced by a gap therebetween, and wherein the sidewall of each through hole is surrounded by the outer annular sidewall of the corresponding retaining recess, such that, in a cross-sectional view, opposing cross-sectional sidewalls of the through hole are positioned between opposing cross-sectional outer sidewalls of the retaining recess; and wherein the brazing filler metal is melted such that molten filler metal fills each retaining recess to form a brazing filler metal pool therein and flows between the opposing joint surfaces of each corresponding pillar and groove to form a brazing filler metal joining portion which joins the joint surfaces, and such that excess molten filler metal flows into the through holes.

2. The joined component according to claim 1, wherein each retaining recess has a depth of 0.3 mm or greater.

3. The joined component according to claim 1, wherein the outer annular sidewall of each retaining recess forms an inclined surface.

4. The joined component according to claim 3, wherein an angle of the inclined surface is 30° or greater and 85° or smaller.

5. The joined component according to claim 1, wherein the first member and the second member are each a sintered body.

6. The joined component according to claim 1, wherein the bottom surface of each retaining recess is a planar surface.

7. The joined component according to claim 1, wherein the bottom surface of each retaining recess has a circular shape.

8. A method for manufacturing a joined component obtained by joining a first joint surface of a first member and a second joint surface of a second member to each other with brazing filler metal, the method comprising:

providing the first member comprising a plurality of pillars axially extending from an inner face thereof, each pillar defining a joint surface having a retaining recess formed therein;

wherein each retaining recess has a bottom surface, an outer annular sidewall and an inner annular sidewall, wherein the outer annular sidewall surrounds and connects with the bottom surface, and the inner annular sidewall is opposite to the outer annular sidewall and connects with the bottom surface;

providing the second member comprising a plurality of grooves formed within an inner face thereof, the grooves being correspondingly shaped to receive the pillars therein, each groove defining a joint surface having a through hole defining a sidewall extending therethrough in a position corresponding to a respective one of the retaining recesses;

placing brazing filler metal into the retaining recesses, and assembling the pillars within the grooves such that the joint surfaces of corresponding pillars and grooves are spaced by a gap therebetween, wherein the sidewall of each through hole is surrounded by the outer annular sidewall of the corresponding retaining recess, such that, in a cross-sectional view, opposing cross-sectional sidewalls of the through hole are positioned between opposing cross-sectional outer sidewalls of the retaining recess; and melting the brazing filler metal by performing heat treatment, wherein molten brazing filler metal fills each retaining recess to form a brazing filler metal pool therein and flows within the gap between the first joint surface and the second joint surface of each corresponding pillar and groove to form a brazing filler metal joining portion which joins the first joint surface and the second joint surface to each other, wherein the gap spreads across the first joint surface and the second joint surface, and such that excess molten filler metal flows into the through holes.

9. The method for manufacturing a joined component according to claim 8, wherein the following condition is satisfied: $1.5<W/(V\times D)\leq 5$, where D denotes a true density of the brazing filler metal, W denotes a mass of the brazing filler metal that is placed into the retaining recesses and V denotes a capacity of each retaining recess, and wherein D is in $g/cm^3$, W is in g, and V is in $mm^3$.

10. The method for manufacturing a joined component according to claim 8, wherein each retaining recess has a depth of 0.3 mm or greater.

* * * * *

UNITED STATES PATENT AND TRADEMARK OFFICE
CERTIFICATE OF CORRECTION

PATENT NO. : 10,788,069 B2
APPLICATION NO. : 15/562108
DATED : September 29, 2020
INVENTOR(S) : Masato Uozumi et al.

Page 1 of 1

It is certified that error appears in the above-identified patent and that said Letters Patent is hereby corrected as shown below:

In the Claims

In Claim 1, Column 15, Line 7, "recess" should read --recesses--.

Signed and Sealed this
Eighth Day of December, 2020

Andrei Iancu
*Director of the United States Patent and Trademark Office*